(12) United States Patent
Areso

(10) Patent No.: US 6,637,669 B2
(45) Date of Patent: Oct. 28, 2003

(54) THERMOSTATIC GAS VALVE WITH A PRESSURE REGULATOR

(75) Inventor: Jon Ganzabal Areso, Vitoria-Gasteiz (ES)

(73) Assignee: Fagor, S. Coop., Mondragon (ES)

( * ) Notice: Subject to any disclaimer, the term of this patent is extended or adjusted under 35 U.S.C. 154(b) by 0 days.

(21) Appl. No.: 10/162,841

(22) Filed: Jun. 4, 2002

(65) Prior Publication Data
US 2003/0136852 A1 Jul. 24, 2003

(30) Foreign Application Priority Data
Jan. 18, 2002 (ES) .......................................... 200200114

(51) Int. Cl.[7] .............................. F23N 1/00; G05D 23/00
(52) U.S. Cl. .................................... 236/15 A; 236/68 D
(58) Field of Search .............................. 236/15 A, 68 D

(56) References Cited

U.S. PATENT DOCUMENTS 3,809,313 A * 5/1974 Branson .................... 236/15 A
5,407,128 A * 4/1995 Schultz

* cited by examiner

Primary Examiner—William Wayner
(74) Attorney, Agent, or Firm—The Kline Law Firm

(57) ABSTRACT

Thermostatic gas valve with a pressure regulator The thermostatic gas valve (1) is adapted for delivering gas flows (7',8') to a main burner and to a pilot burner of a heater appliance and comprises a valve body (3) with a plurality of internal gas distribution chambers (4,5,5') interconnected to a manual valve (11), to a main flow (7') thermostatic modulating device (12), and to an electromagnetic safety valve (9) energised by a thermocouple (10), between a gas inlet duct (6) and outlet ducts (7,8) for said flows (7',8'). An inlet pressure (Pe) regulator device (2) provided with a diaphragm type stabilising valve (18,19), is inserted in said inlet duct (6) in direct communication with the safety valve (9) via a flat conduit (27) under a valve body cover (14).

5 Claims, 1 Drawing Sheet

THERMOSTATIC GAS VALVE WITH A PRESSURE REGULATOR

TECHNICAL FIELD

The present invention relates to a thermostatic gas valve for regulating the combustion in a domestic heating appliance or cooker using a diaphragm valve for regulating the maximum gas pressure delivered at the valve inlet.

PRIOR ART

Thermostatic gas valves are already known for the delivery of a modulated main gas flow to a main burner and of a pilot gas flow to a pilot ignition burner, such as that disclosed in ES-2145652 (No. 96001716)/U.S. Pat. No. 5,816,490, wherein the valve body comprises a plurality of internal gas distribution chambers, a gas inlet duct from a supply, a main flow outlet duct, and a pilot flow outlet duct. An electromagnetic safety valve held open by a thermocouple is built in adjacent to the inlet duct and it controls the incoming gas to the valve, which is distributed in a main flow modulated by a thermostatic bellows valve, and in a pilot flow transmitted to an outlet duct connectable to the pilot burner. The internal gas distribution chambers are sealed to the exterior by flat covers screwed on to different surfaces of the body.

An arrangement is also known of a maximum gas pressure regulator in a thermostatic valve which delivers a modulated flow to a main burner and a pilot flow to a pilot burner, as the one disclosed in U.S. Pat. No. 3,666,173. The pressure regulator is connected downstream between the safety valve outlet and the pilot flow outlet duct, and is also connected to a thermostatic valve which receives a gas pressure to modulate a main gas flow.

DISCLOSURE OF THE INVENTION

The object of the invention is a thermostatic gas valve for the delivery of a modulated gas flow to a main burner, with a maximum inlet pressure regulating device built into the body of the thermostatic valve and connected directly at the thermostatic valve inlet duct.

The pressure regulator device comprises a cylindrical body with an internal enclosure divided by a diaphragm type valve. The diaphragm defines a gas chamber stabilised at a nominal pressure value downstream from the valve. The pressure regulator device is fitted into the thermostatic valve from the outside, in a housing in the valve body wherein it is inserted, connected directly at the thermostatic valve inlet duct. The upstream and downstream gas passage conduits directed to and from the regulator device are formed in the body of the thermostatic valve, without altering the construction of the plurality of the thermostatic valve internal gas distribution chambers.

DETAILED DESCRIPTION OF THE PREFERRED EMBODIMENT

Figure 1:
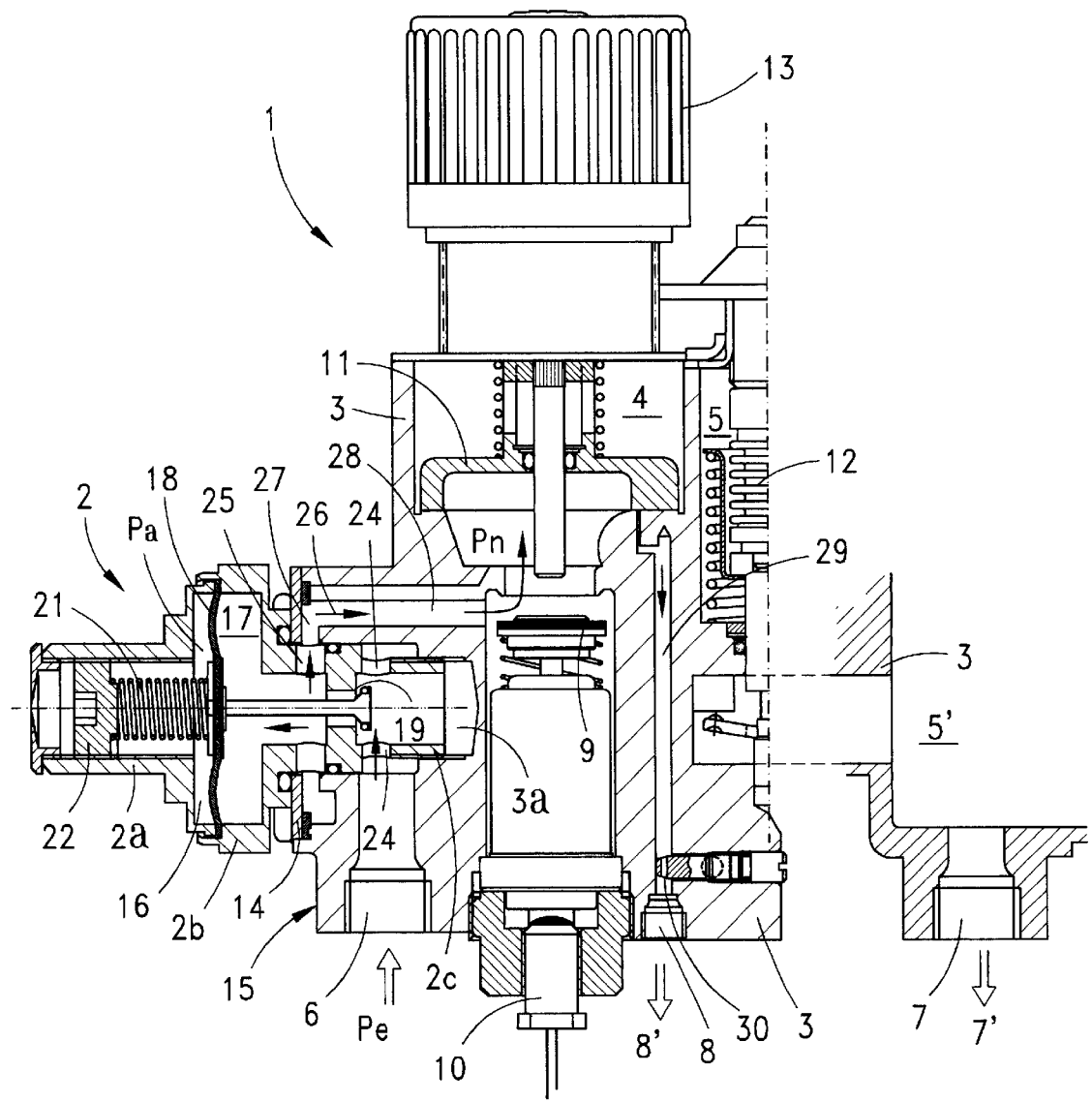
FIG. 1 is a cross-sectional elevation of a gas thermostatic valve with a gas inlet pressure regulating device.

With reference to FIG. 1, a preferred embodiment of a thermostatic gas valve with a gas inlet pressure regulator device 2, comprises a metal thermostatic valve body 3 with a plurality of internal gas distribution chambers 4,5, at least one gas inlet duct 6 from a supply, at least one main flow 7' outlet duct connectable to a main burner of a heater appliance, a pilot flow outlet duct 8 connectable to a pilot burner, a housing 3a for the regulating device 3, and an electromagnetic safety valve 8 energised by a pilot flame detecting thermocouple 10, in communication with the gas inlet duct 6. The main flow 7' is modulated by a rotary valve 11, a bellows device 12 actuated by a temperature sensor, and a gradual opening valve (not shown in the figure) associated with the bellows device 12 for the modulation of the main flow 7'. A manual rotary control 13 establishes the different regimes of gas supply to both burners from valve 1. The internal gas distribution chambers 4,5 in the body are sealed to the exterior by flat covers 14 screwed to the body, one of which, shown in the figure, is situated on a lateral face 15 of the body relative to the inlet duct 6.

The pressure regulator device 2 has a hollow cylindrical-shaped body 2a–2c with a central diameter flare 2b, wherein a hollow enclosure 16,17 is formed, and is provided with a diaphragm 18 which actuates a stabilising valve 19 into the cylindrical body. A lower part 2c of the pressure regulator body is screwed into the body 3 of the thermostatic valve, connecting the stabilising valve 19 to the inlet duct 6. An upper part 2a of the pressure regulator body houses a variable force spring 21 and an adjusting screw 22 accessible from the outside, for adjusting the stabilising valve 19. The regulator device diaphragm 18 separates to one side a chamber 16 in communication with exterior atmospheric pressure Pa, and a stabilising gas chamber 17 with the stabiliser valve 19 which receives the delivery of gas at a pressure Pe from the inlet duct 6, and raises its sealing member (not referenced in drawings) limiting the gas delivery pressure Pe to a nominal value Pn, 6 bar for instance.

The housing 3a in the thermostatic valve body is formed from a lateral face 15 closed with a flat cover 14, perforated with a cylindrical hole for fitting the regulator device 2. The airtight sealing of the regulator device 2 in its housing 3a is achieved by resting its central part 2b against the cover 14 with an intermediate seal 23.

In its lower part 2c the regulator device 2 has at least a passage hole 24 in communication with the inlet duct 6, and at least a passage hole 25 downstream outgoing from the stabilising valve 19 and in communication with the safety valve 9. The gas stream 26 stabilised at a nominal pressure Pn, is ducted to the safety valve 9 by way of a flat conduit 27 formed between the cover 14 and a exterior wall of the thermostatic valve body 3, and faced to a passage hole 25.

Downstream from regulator device 2, from the flat conduit 27 the stabilised gas supply 26 flows towards the safety valve 9 through a cylindrical conduit 28 perforated from said lateral surface 15 of the body under the cover 14. Downstream of the safety valve 9 the stabilised gas supply is passed on to the manual valve 11, wherefrom it is distributed, once actuated by the rotary control 17, to a chamber 4 in the manual valve and to an independent restricted flow conduit 29 in communication with the pilot outlet duct 8. Turning the control 13 to the "pilot" angular position permits the passage of a small part of the stabilised gas stream 26 to said independent duct 29, which is formed in the thermostatic valve body 3, up to the outlet duct 8 connectable to the pilot burner. The stabilised pilot flow 8' leaving the outer duct 8 is regulated by way of a restricted passage 30 situated in said independent conduit 29. A larger part of the stabilised gas supply 26 is ducted from the chamber 4 of the manual valve 11 to a chamber 5 in the thermostatic device 12 and from here to a chamber 5' housing a thermostatic valve for modulating the main flow 7', and to the outlet duct 7 connectable to the main burner.

What is claimed is:

1. A thermostatic gas valve adapted for delivering a main flow to a main burner and a pilot flow to a pilot burner of a heater appliance, comprising:

a metal valve body with a plurality of internal gas distribution chambers, interconnected to a manual valve, to a thermostatic device for modulating the main flow, and to at least one electromagnetic safety valve energised by a thermocouple for detection of an ignition pilot flame;

at least one gas inlet duct from a supply at a delivery pressure Pe, at least one main flow outlet duct connectable to the main burner, a pilot flow outlet duct connectable to the pilot burner, and a device for regulating the aforesaid pressure Pe delivered to the thermostatic valve, having a valve for stabilising said delivery pressure Pe;

wherein the regulating device is configured as a cylindrical-shaped hollow metal body, installed from the outside in a housing in the thermostatic valve body, in direct connection with an inlet duct and in communication downstream with a safety valve in series with said inlet duct for stabilising the pilot flow gas pressure.

2. A thermostatic gas valve according to claim 1, wherein said regulator device for its connection to said inlet duct upstream and downstream of the stabilising valve is perforated by at least one passage hole connected to the inlet duct at said delivery pressure Pe to the stabilising valve, and at least one through-hole directed towards the safety valve for the passage of a flow of gas stabilised at a nominal pressure Pn of the thermostatic valve.

3. A thermostatic gas valve according to claim 1, wherein the thermostatic valve body has a flat conduit formed between the wall and a flat cover of the valve body, which ducts a flow of gas from the regulating device outlet at a stabilised nominal pressure Pn of the thermostatic valve.

4. A thermostatic gas valve adapted for delivering a main flow to a main burner and a pilot flow to a pilot burner of a heater appliance, comprising:

a metal valve body provided with a flat cover on at least one outer surface of the body, and a plurality of internal gas distribution chambers, interconnected to a manual valve, to a thermostatic device for modulating the main flow, and to at least one electromagnetic safety valve energised by a thermocouple for detection of the ignition pilot flame;

at least one gas inlet duct from a supply at a delivery pressure Pe, at least one main flow outlet duct connectable to the main burner, and a pilot flow outlet duct connectable to the pilot burner; and a device for regulating said pressure Pe of the gas delivered to the thermostatic valve, having a valve for stabilising said delivery pressure Pe;

wherein the regulating device is configured as a cylindrical-shaped hollow metal body, installed in direct connection with an inlet duct and in communication downstream with a safety valve via a flat conduit formed under said thermostatic valve body cover for stabilising the gas pressure of the pilot flow.

5. A thermostatic gas valve according to claim 4, wherein said regulator device for its connection to said inlet duct upstream and downstream of the stabilising valve is perforated by at least one passage hole connected to the inlet duct at said delivery pressure and to said flat communicating conduit under said cover.

* * * * *